United States Patent [19]

Hartley

[11] Patent Number: 4,669,932
[45] Date of Patent: Jun. 2, 1987

[54] KEYLESS TOOL CHUCK

[76] Inventor: Wayne Hartley, 1429 Mosstree Rd., North Charleston, S.C. 29406

[21] Appl. No.: 737,548

[22] Filed: May 24, 1985

[51] Int. Cl.$^4$ .............................................. B23B 31/06
[52] U.S. Cl. .............................. 408/239 R; 279/1 K; 279/60; 279/62; 408/124
[58] Field of Search ............... 408/239 R, 239 A, 240, 408/124; 279/1 K, 60, 61, 62, 63, 64, 65

[56] References Cited

U.S. PATENT DOCUMENTS

| | | | |
|---|---|---|---|
| 3,970,323 | 7/1976 | Schnizler | 279/64 |
| 4,016,941 | 4/1977 | Sanders | 279/1 K X |
| 4,277,074 | 7/1981 | Kilberis | 279/60 |
| 4,317,578 | 3/1982 | Welch | 279/60 |
| 4,323,324 | 4/1982 | Eberhardt | 279/1 K X |
| 4,358,230 | 11/1982 | Rohlin | 279/62 X |
| 4,460,296 | 7/1984 | Sivertson, Jr. | 279/1 K X |
| 4,526,497 | 7/1985 | Hatfield | 279/1 K X |

Primary Examiner—Eugene F. Desmond
Assistant Examiner—Glenn L. Webb
Attorney, Agent, or Firm—B. Craig Killough

[57] ABSTRACT

A keyless tool chuck is disclosed which may be used with most power tools having standard chucks. The jaws of the chuck are displaced and retracted by controlling the rotation of a threaded collar which surrounds the jaws relative to the rotation of the tool shaft and the jaws. This rotation is controlled by displacing a plate so as to control rotation of the collar in a first embodiment. In a second embodiment, rotation of the chuck collar is controlled by a clutch means, and in a third embodiment the rotation of the chuck collar is controlled relative to the jaws by means of vanes which are inserted into a grooved cylinder attached to the chuck collar.

18 Claims, 15 Drawing Figures

KEYLESS TOOL CHUCK

FIELD OF THE INVENTION

This Invention relates generally to chucks which are used for mating tools with drive means, and is more particularly directed to a chuck which can be actuated to grasp and release the driven tool through the rotation of the drive means, without the use of a chuck key.

BACKGROUND OF THE INVENTION

Power tools of all types use chucks to hold other tools in place which are to be driven. The tools may be large machine tools which are used in production machine environments, or may be small hand held drills into which drill bits of varying sizes are placed for driving. The most common tool which uses a chuck is a hand held drill, and for demonstrative purposes, will be used herein.

Drills commonly in use incorporate a motor which turns a shaft. A chuck is attached to the end of the shaft, into which a tool of the desired size is inserted and held. The combination is either called a drill motor and drill, or a drill and drill bit. In the former case, the drill motor provides rotation, with the drill being the tool which is rotated to produce a hole of a desired size in a material. In the latter case, which is usually associated with smaller, hand held drills, the drill is the device which provides the rotation, while the drill bit is the tool which actually produces the hole. The latter terminology will be used consistently herein.

The drill bit is mated to the drill by means of a chuck. As stated before, tools of all kinds use chucks, however, the chucks in common use are substantially similar. The chuck will commonly have three or four jaws which are relatively long and narrow, and are displaced angularly from the chuck body. The angular displacement allows for drill bits of varying diameters to be inserted therein, with a large diameter bit received when the jaws are retracted, and a smaller bit when the jaws are displaced.

Displacement and retraction of the jaws is accomplished by means of a threaded collar which surrounds the jaws. Grooves are present on the upper end and outside surface of the jaws so as to interact with the threaded collo. Rotation of the ring at a different velocity than the tool or drill shaft on which the jaws are located results in the displacement or retraction of the jaws due to the threaded interaction between the collar and the jaws.

As most commonly used in the prior art, displacement and retraction of the jaws is accomplished by manual means. A key having gear teeth cut therein is mated with gear teeth cut within the threaded ring so as to allow for the threaded ring to be rotated about the jaws. As the ring rotates about the jaws, the jaws are displaced or retracted, according to the direction of the rotation. As the jaws are displaced against the dril bit, torque is increased through the key to hold the jaws tight against the bit.

Chucks presently in widespread use then are actuated by rotating the threaded ring or collar at a different velocity than the jaws, with displacement or retraction dictated by the direction of rotation. Accordingly, it has long been recognized by persons using such tools as power drills that "power chucking" can be accomplished by manually holding the threaded ring or collar, or the cylinder which is attached thereto, while actuating the drill. In addition to being dangerous, manual pressure is generally insufficient to fully secure the drill bit within the chuck, and cannot be used to release the bit from the chuck. The chuck key must be resorted for releasing or finally securing the bit.

The prior art reveals various devices which aid the manual holding of the threaded ring or collar to allow for the complete tightening and releasing of the drill bit within the chuck when used with a reversible drill. These devices generally incorporate the manual method outlined above, but improve on same by providing a sliding collar or cylinder or similar device having lugs or teeth on one surface thereof which may be displaced and inserted into detentes or other voids on the drill so as to mate therewith. In essence, they provide a more positive method of manually securing the threaded ring or collar so that the torque of the drill can be used to fully tighten the chuck against the drill bit, as well as to loosen the chuck to remove the bit.

The devices found in the prior art are awkward to use, do not adequately deal with inertia when the chuck becomes fully tightened against the bit, and have not found widespread acceptance. For example, when a relatively small bit is initially inserted into the chuck, it is frequently necessary to hold the bit concentric with the shaft so that it does not lodge between the jaws in an improper fashion. At the same time it is necessary to hold the actuation collar or cylinder of the keyless chuck, while still at the same time manually actuating the switch of the drill's motor. Since very few operators have more than two hands available, it is very difficult to perform all three of these functions simultaneously as required by the keyless chucks found in the prior art. Further, these devices disengage the collar or cylinder by the torque of the motor and inertia when the jaws fully tighten against the drill bit. Inertia and the torque of the drill motor force the teeth or lugs out of the detentes or voids into which they are mated when the chuck is fully tightened. This design causes significantly wear on the lugs and detents, and is dangerous in its method for forcing the collar or cylinder out while it is being manually held.

SUMMARY OF THE INVENTION

The present invention provides a keyless tool chuck which may be used with any tool having a chuck of the type previously described which is the type most commonly in use, and in which the direction of rotation of the tool may be changed as desired, that is, that the tool is reversible in its direction of rotation.

The present invention provides an impact plate 24 which may be displaced and retrieved along a portion of the drill in a positive fashion so as to contact a drive collar 22 which controls the rotation of threaded chuck collar 20, causing the chuck collar to rotate at a different velocity than the jaws upon actuation of the drill, and to accordingly displace and retract the jaws.

As will be seen more fully herein, a slight rotation of a positioning collar 30 positions the device so as to allow loosening or tightening of the chuck, depending on the rotation of the drill shaft, without requiring manual contact during rotation of the drill and the device. The device further allows tightening and loosening of the chuck by means of impacting, which allows the drill bit or other tool to be held firmly within the chuck.

Further, and as will be seen more fully herein, the device allows for the impact plate 24 and the drive collar 22 to slip upon the chuck becoming fully tightened, so as to not cause damage to the tool or danger to the user. The device further incorporates a feature which disengages the impact plate upon the jaws 18 reaching the fully loosened position, so as to not cause damage to the tool or danger to the user. In the embodiment outlined above, the device provides a keyless drill chuck which provides full and positive loosening and tightening of the chuck without manual contact from the user when the drill is actuated.

Other embodiments are disclosed which use a multiplicity of vanes in conjunction with a multiplicity of grooves formed in a cylinder to control the rotation of the cylinder, and in turn control the rotation of the chuck collar in relation to the jaws so as to allow displacement and retraction of the chuck jaws. These embodiments also allow the user to control the tightening and loosening of the chuck jaws without touching or contacting the moving parts of the tool upon actuation of the tool

DETAILED DESCRIPTION OF THE DRAWINGS

Figure 1:
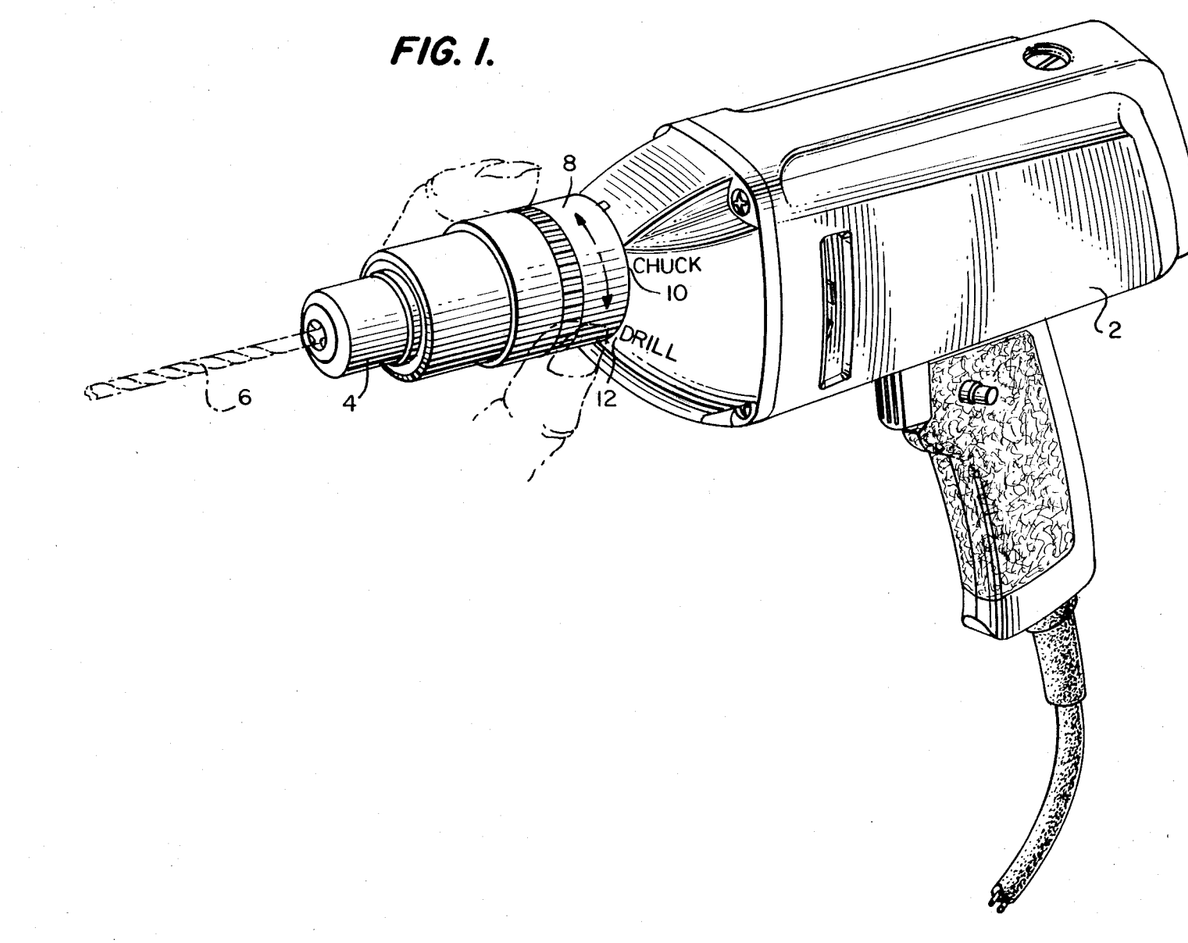
FIG. 1 is a perspective view of a power drill incorporating the invention, with chuck and drill bit shown in place.

FIG. 1 shows a hand held electric drill 2 of the type commonly in use. The drill 2 that is contemplated herein is a reversible drill, so that the chuck 4 and drill bit 6 may be caused by an electric motor of the drill to rotate clockwise or counterclockwise as selected by the user. Cylinder 8 may be rotated so as to position cylinder 8 and the invention in either the chuck mode 10 or drill mode 12.

Figures 2, 3, 4:
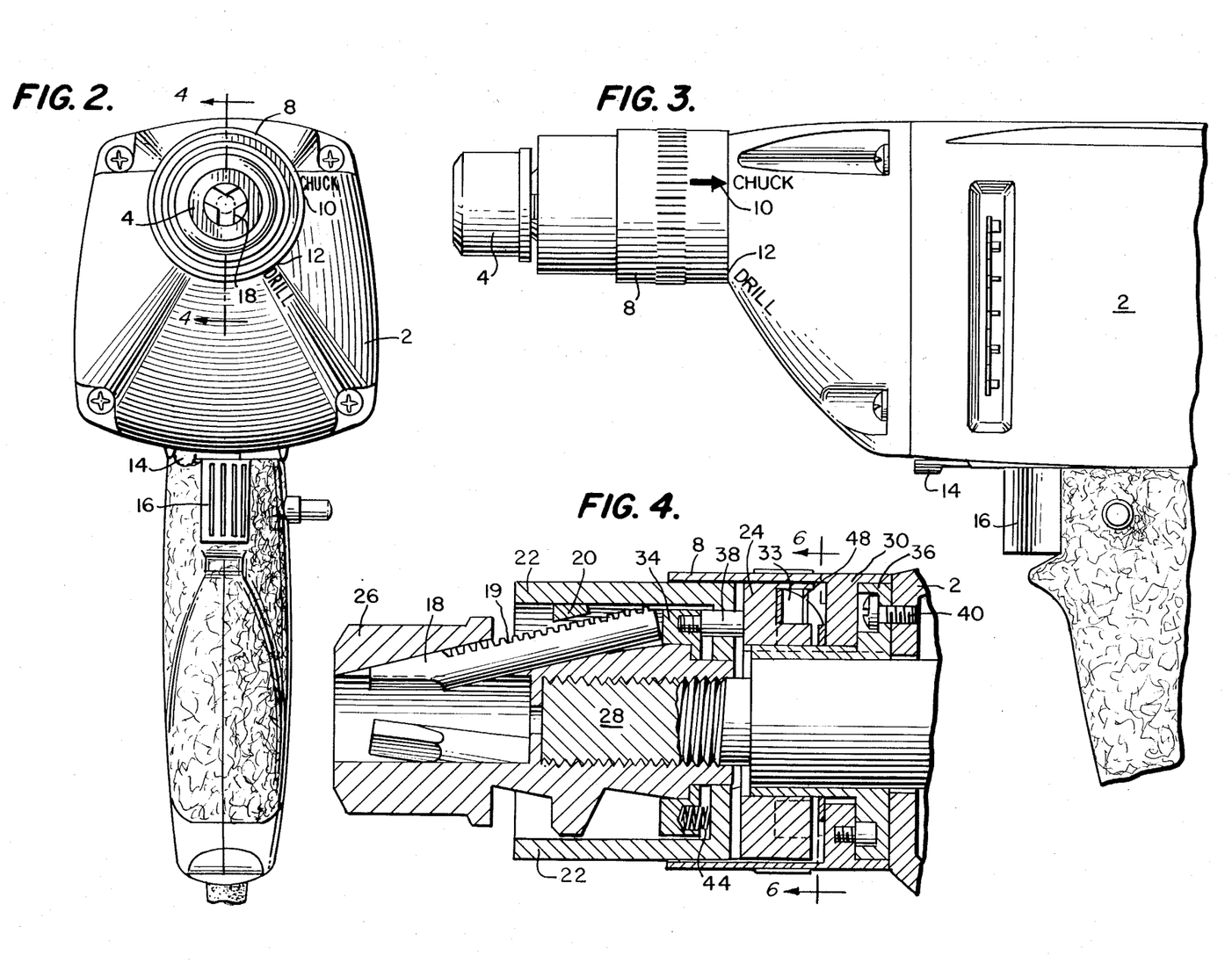
FIG. 2 is a front elevation of the drill shown in FIG. 1.
FIG. 3 is a partial side elevation showing the drill shown in FIG. 1.
FIG. 4 is a partial sectioned view taken essentially along line 4—4 of FIG. 2.

FIG. 2 depicts the drill 2 shown in FIG. 1. Shown are reversing switch 14 and actuation switch 16.

FIG. 3 shows a partial view of the drill of FIGS. 1 and 2, with the cylinder 8 placed in position for the chuck mode 10.

FIG. 4 shows the internal elements of the invention. The angular jaws 18 of the chuck are shown, as well as the threaded chuck collar 20 which provides a threaded interaction between the jaws 18 and the collar 20 so as to displace and retract the jaws 18. The jaws 18 are contained in the chuck housing 26, both of which rotate constantly with the drill shaft 28 upon actuation of the drill. Also shown is the drive collar 22 which is attached to the chuck collar 20, and the impact plate 24 which is used to control the rotation of the drive collar 22 and chuck collar 20. The positioning collar 30 and attached cylinder 8 are rotated to put the invention in the drill mode 12 or chuck mode 10, by attached leaves 33 controlling the position of the impact plate 24 along the length of the drill shaft 28. Disengaging plate 34 disengages impact plate 24 upon full retraction of jaws 18 via legs 38 contacting plate 24. Face plate 36 is used to provide a base for other components, including a base for movement of impact plate 24 along drill shaft 28, and is attached to the drill 2 via screws 40.

Figure 5:
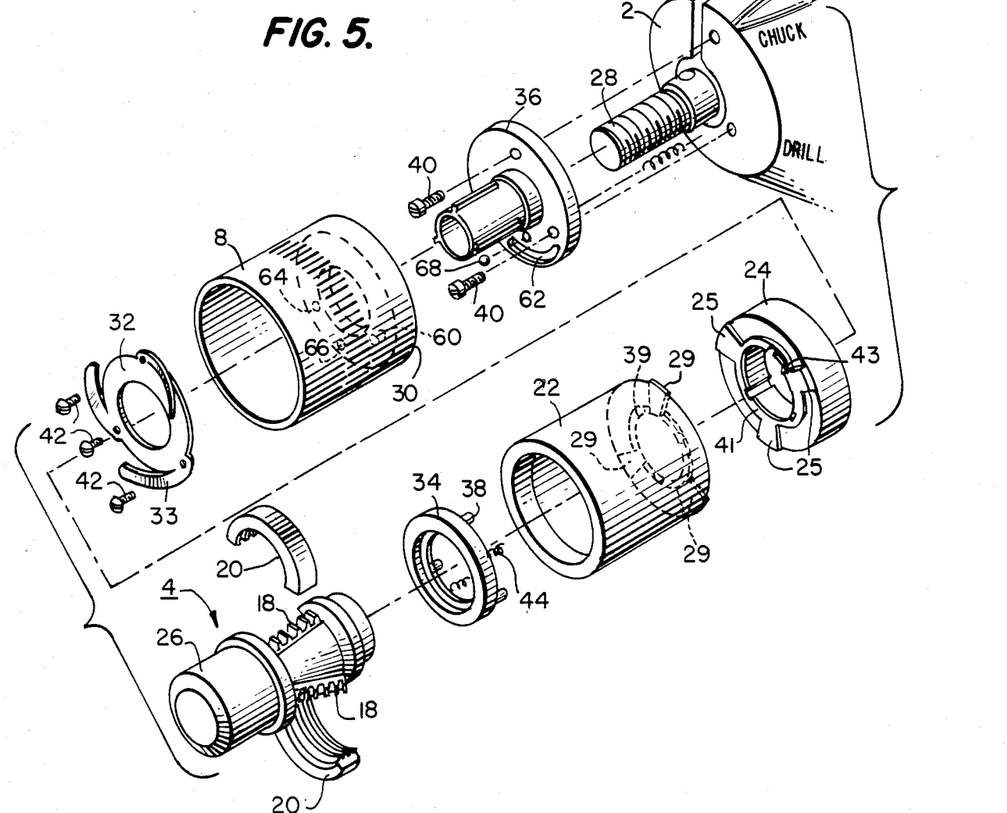
FIG. 5 is an exploded view of the invention.

FIG. 5 shows, in order, beginning from the drill body 2, drill shaft 28, face plate 36, mounting screws 40, positioning collar 30 as a phantom and cylinder 8, retriever 32, leaves 33 and screws 42, impact plate 24, drive collar 22, disengaging plate 34 with legs 38, springs 44, and chuck 4, showing chuck collar 20 and jaws 18.

Figure 6:
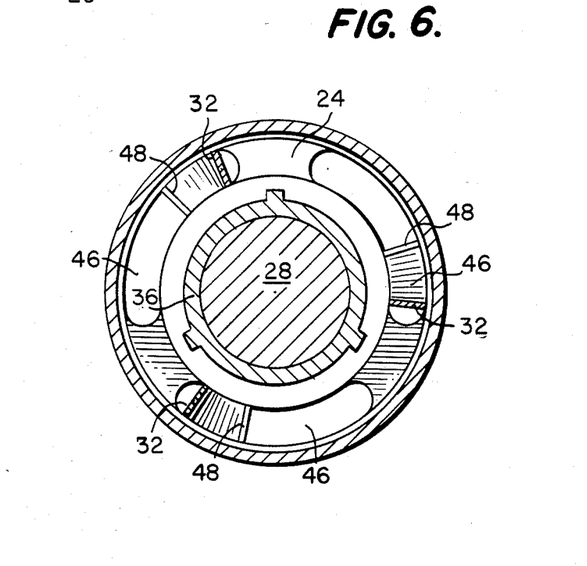
FIG. 6 is a sectioned view taken essentially along line 6—6 of FIG. 4.

FIG. 6 shows as an elevation the surface of impact plate 24 which is not fully disclosed by FIG. 5. It shows voids 46 into which the retriever leaves 33 enter for retraction of the impact plate 24, and the pins 48 against which the retriever leaves 33 pull to accomplish retraction.

Figures 7, 8, 9:
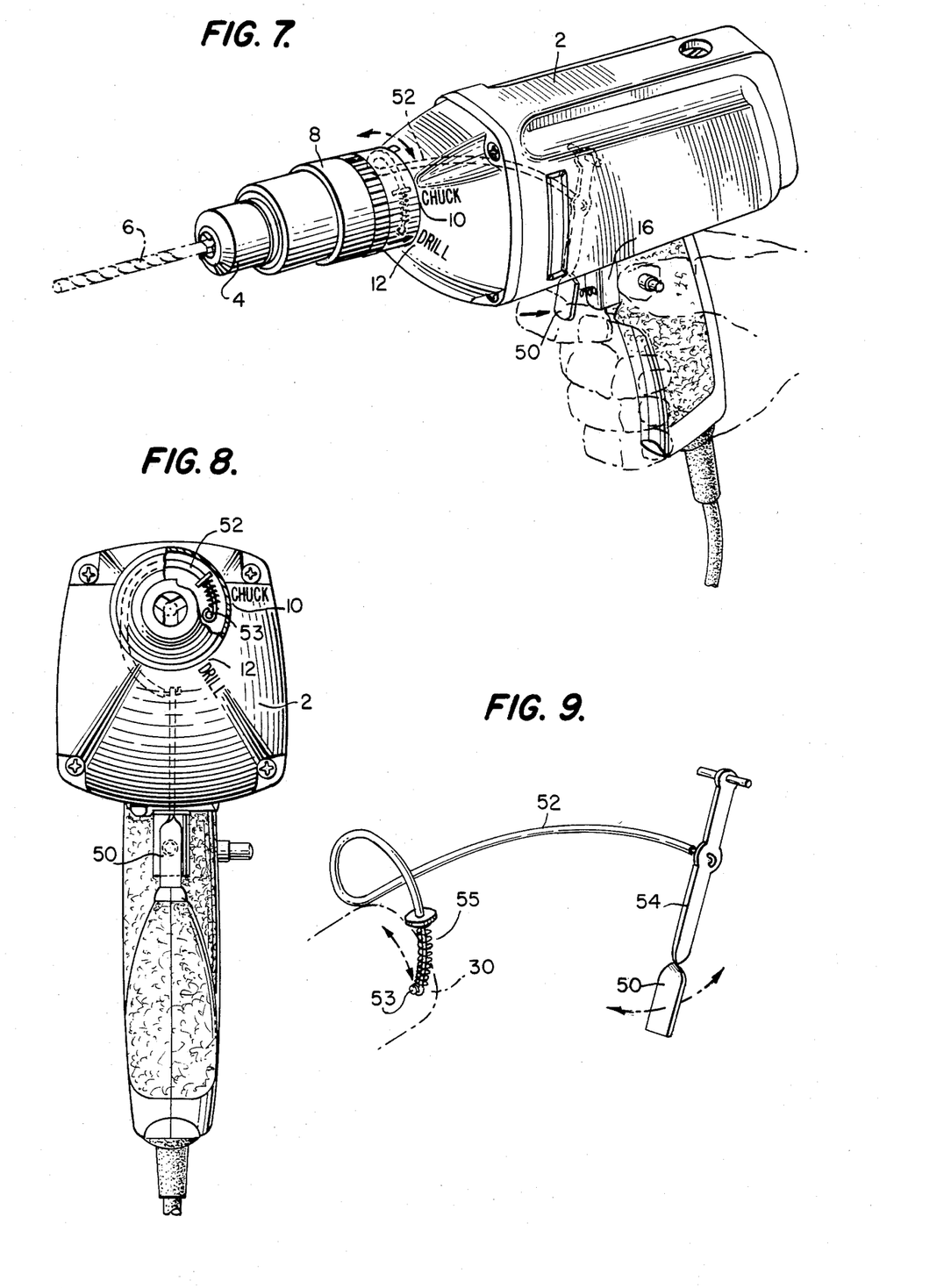
FIG. 7 is a perspective view of a drill showing as a phantom a cable means of actuation for the invention.
FIG. 8 is a front elevation of the drill shown in FIG. 7.
FIG. 9 is an isolation of the cable actuation means shown as a phantom in FIG. 7.

FIG. 7 shows the drill 2 shown in FIG. 1 incorporating the invention, but further including a cable actuated means for accomplishing the rotational positioning of the positioning collar 30. The trigger 50 and cable 52 are used to accomplish the slight rotation of the positioning collar 30 which is needed to actuate or de-actuate the device so as to place it in the chuck 10 or drill 12 mode.

FIG. 8 shows the cable actuation means with part of the device being cut away so as to show the attachment of cable 52 to the positioning collar 30 at pin 53.

FIG. 9 shows the trigger 50 and lever 54 which are used to actuate the movement of the cable 52 in response to the movement of the trigger 50. A spring 55 actuates return to drill mode 12 upon release of trigger 50.

Figure 10:
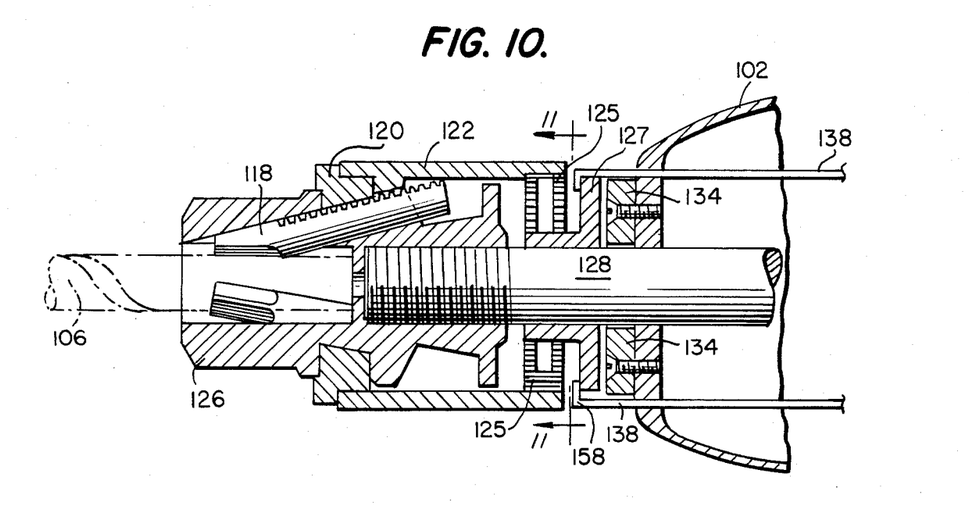
FIG. 10 is a partial, sectioned view of a second embodiment of the invention.

FIG. 10 shows a second embodiment of the device. The similarities with the previous embodiment include a chuck 126 having angularly displaced jaws 118, as controlled by the threaded chuck collar 120. Rotation of the chuck collar 120 is similarly controlled as in the first embodiment by a cylinder 122 attached to the chuck collar 120. In this embodiment, rotation of the cylinder 122 and chuck 126 are controlled by vanes 125 attached to a clutch 127. Levers 138 are used to displace the clutch 127 against plate 134 attached to the drill body 102, controlling rotation of the clutch 127 and ultimately rotation of the chuck collar 120 relative to the drill shaft 128 and jaws. A drill bit 106 is held within the chuck 128 by jaws 118.

Figures 11, 12:
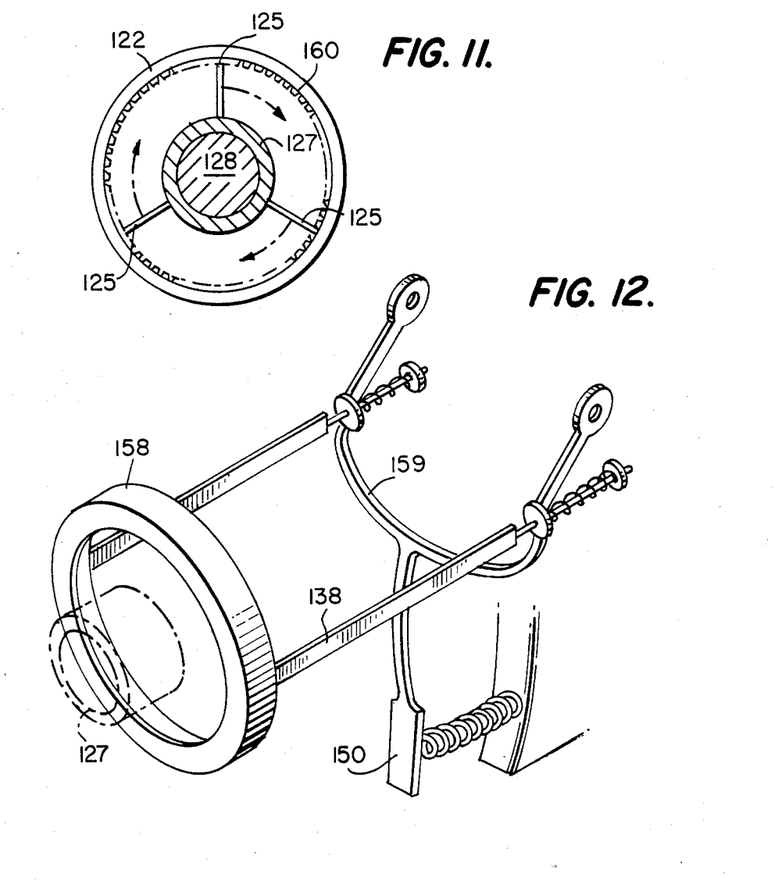
FIG. 11 is a sectioned view taken essentially along lines 11—11 of FIG. 10.
FIG. 12 is a perspective view of an actuation device for the additional embodiment.

FIG. 11 shows grooves 160 cut or formed on the inside diameter of the cylinder 122, and shows the rotation of the vanes 125 within the cylinder.

FIG. 12 shows a race 158 which may be controlled by levers 138 which are in turn centrally controlled by a trigger 150 connected to a drill 102 so as to displace clutch 127 against plate 134 upon actuation.

Figure 13:
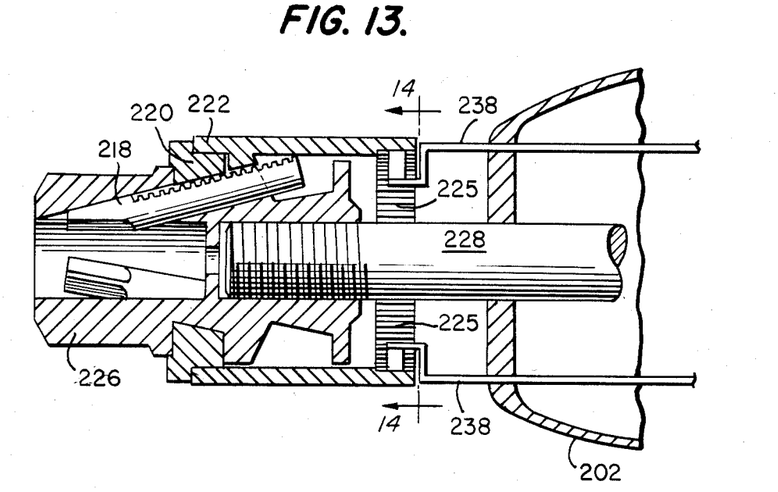
FIG. 13 is a partial, sectioned view of a third embodiment of the invention.

FIG. 13 shows a third embodiment of the device. As with the first two embodiments, it comprises a chuck 226 having angularly displaced jaws 218, a chuck collar 220, and a cylinder 222 very similar to the cylinder 122 in the second embodiment (FIG. 10). Levers 238 which may be displaced into and retracted from the cylinder having vanes 225 thereon are used to control rotation of the cylinder 222 and chuck collar 220.

Figure 14:
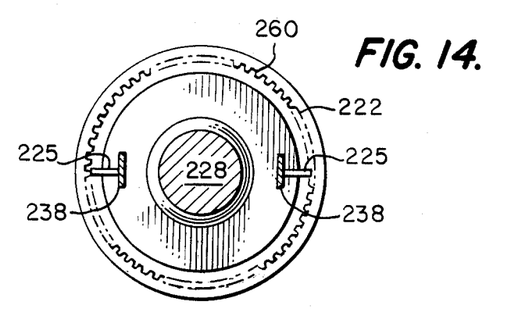
FIG. 14 is a sectioned view taken essentially along lines 14—14 of FIG. 13.

FIG. 14 shows the cylinder having grooves 260 therein, and the interaction of the vanes 225 with the grooves 260 to control the rotation of cylinder 222.

Figure 15:
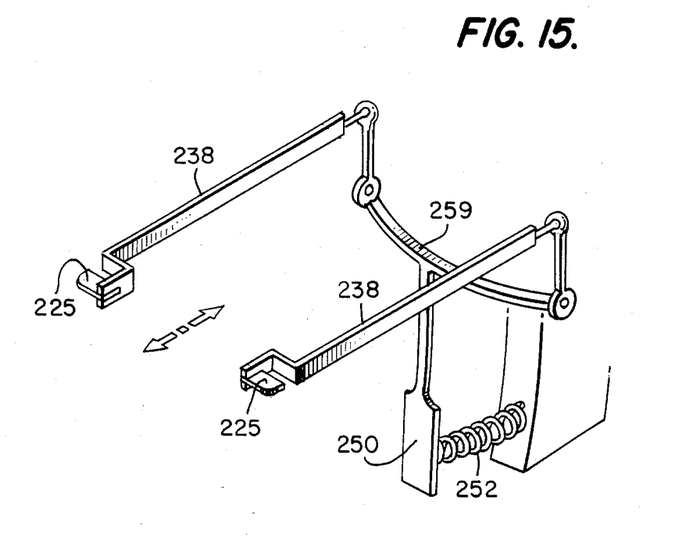
FIG. 15 is an actuation device for the third embodiment of the invention as shown in FIG. 13.

FIG. 15 shows levers 238 centrally controlled by a spring loaded 252 trigger 250 which is used to displace the vanes 225 via stirrup 259 and levers 238 into and out of cylinder 222 to control the rotation of collar 220.

DESCRIPTION OF THE PREFERRED EMBODIMENTS

This invention may be used with any driven tool utilizing a chuck to mate a tool to a motor or other driving means. The only requirement is that the driving means be reversible so as to be capable of selective rotation in either a clockwise or counterclockwise direction. FIGS. 1, 2 and 3 show a reversible, hand held power drill of the type commonly available. The drill has a body 2 in which an electric motor is contained. Connected to the electric motor is a shaft 28, which turns the chuck 4. A drill bit 6 is placed into the chuck 4, and the chuck 4 is tightened to securely hold the drill bit 6 in a manner which is concentric with the chuck 28. The drill is actuated by depressing a switch 16, and rotation of the shaft 28 may be reversed by switch 14.

To use the device, a drill bit 6 of the desired size is selected. Collar 8 is rotated to the chuck mode 10 where it will reach a stop. Switch 14 is then positioned so that the rotation of the shaft is, in this embodiment, counterclockwise. When switch 16 is depressed to actuate the drill, chuck jaws 18 will retract so as to open the chuck 4. Once jaws 18 are open sufficiently, switch 16 may be released to stop rotation of the drill, and bit 6 may be inserted between chuck jaws 18. Switch 14 is now repositioned so that the drill will rotate in the opposite (clockwise) direction, and switch 16 is depressed to actuate the drill. The rotation of the drill causes chuck jaws 18 to be displaced forward and tightened against drill bit 6, and will tighten sufficiently so that the drill bit is securely held in place. Cylinder 8 is now repositioned to the drill mode 12, and the drill and drill bit are ready for use in drilling. To remove the drill bit, the collar 8 is rotated back to the chuck mode 10, switch 14 is positioned in the reverse (counterclockwise) mode, and switch 16 is depressed. In use, cylinder 8 is positively positioned in either the chuck mode 10 or drill mode 12 prior to actuation of the drill 2, and it is not necessary to touch any part of drill 2 except switch 16 while the drill and chuck 4 are actuated to provide for "chucking" and "unchucking".

This invention may be used with standard tools and standard chucks. The only modification which may be necessary is the requirement of a slightly longer shaft 28 on some tools so that the invention can be positioned between the tools such as drill 2 and the chuck 4.

Chucks which are commonly in use have three or four angularly displaced jaws 18 which are contained within a body 26 or housing. The jaws 18 are relatively long and narrow, and as they are displaced will narrow the radius of the opening into the chuck body 26 so as to contact and hold drill bits of varying diameter. The smaller the diameter of the drill bit, the greater the displacement of the chuck jaws. The chuck jaws may be displaced fully so that they ultimately contact each other. Each of the chuck jaws has grooves 19 therein so as to accomplish a threaded interaction with chuck collar 20. Chuck collar 20 is threaded and circular so as to contact each of the chuck jaws. Rotation of the collar 20 while the chuck jaws 18 are static will cause the chuck jaws 18 to displace or retract according to the direction of rotation via the threaded interaction between collar 20 and chuck jaws 18. The chuck jaws 18 are located within chuck body 26, which is in turn attached to shaft 28, so that chuck body 26 and chuck jaws 18 normally rotate at the same rate as shaft 28, which in turn rotates at the same rate as the drill motor. Most drills commonly in use allow for displacement and retraction of the chuck jaws by rotating the collar 20 around static jaws 18 by means of a chuck key having gear teeth which interact to control the chuck collar. However, the chuck jaws need not be stationary to accomplish displacement and retraction. It is only necessary that the chuck collar and jaws rotate at a different velocity. Accordingly, displacement and retraction of the chuck jaws 18 may be accomplished by rotating shaft 28, while slowing or stopping rotation of chuck collar 20.

The slowing and stopping of chuck collar 20 while shaft 28 continues to rotate is accomplished by means of an impact plate 24 which may be displaced along a portion of the length of shaft 28. Full displacement causes plate 24 to contact drive collar 22, which is affixed to and rotates with chuck collar 20. When impact plate 24 is retracted, chuck collar 20 and drive collar 22 will rotate at the same velocity as shaft 28 due to the contact between jaws 18 and chuck collar 20. When impact collar 24 is displaced into and against drive collar 22, the rotation of drive collar 22 and chuck collar 20 is slowed and then stopped since impact plate 24 does not rotate. Shaft 28 and jaws 18 continue to rotate, and the threaded interaction between chuck collar 20 and chuck jaws 18 cause displacement or retraction of the chuck jaws depending upon the direction of rotation of shaft 28.

Impact plate 24 is displaced along face plate 36, which is fixably attached to the drill body 2 in a concentric fashion around shaft 28, but does not contact shaft 28 and does not rotate. Splines are provided on face plate 36 over which impact plate 24 is located so as to allow displacement and retraction along the length of shaft 28, but to prevent any rotation of impact plate 24.

Actual displacement of impact plate 24 is accomplished by means of positioning collar 30 and retriever 32, which are positioned in a concentric fashion between face plate 36 and impact plate 24. Positioning collar 30 is located on face plate 36 so as to prevent displacement along the length of shaft 28, but to allow limited rotation of positioning collar 30 about face plate 36. This limited rotation of positioning collar 30 is accomplished by lug 60 which rides in groove 62, and positive positioning of collar 30 is facilitated by means of detentes 64, 66 in which spring loaded ball 68 locates as collar 30 is rotated to the chuck position or drill position. The degree of rotation of collar 30 is dictated by groove 62. Rotation must be sufficient to allow retriever leaves 33 to fully displace and retract plate 24. Collar 30 may be retained on plate 36 by a ring type ("C") clip. Cylinder 8 is attached to collar 30 in a concentric manner so as to shield the user from moving parts, as well as to protect the invention and provide a aesthetic appearance.

Retriever 32 is attached in a concentric fashion to collar 30 opposite face plate 36 by means of screws 42. Leaves 33 of retriever 32 interact with plate 24 to provide actual displacement and retrieval of impact plate 24. As shown in FIG. 6, impact plate 24 has on one surface thereof a series of voids 46 equal to the number of leaves 33 preferably three. Rotation of postioning collar 30 causes rotation of leaves 33, which accordingly enter and retreat from the voids 46. As postioning collar 30 is rotated to drill mode 12, leaves 33 enter the voids and pull against their respective pins 48 which in turn pulls impact plate 24 away from drive collar 22. Accordingly, chuck collar 20 and chuck jaws 18 rotate in the same direction at the same velocity, and the jaws 18 are neither retracted or displaced. Rotation of postioning collar 30 to the chuck mode 10 on the otherhand causes leaves 33 to leave voids 46, and to push against impact plate 24 so as to cause impact plate 24 to contact drive collar 22. As indicated before, the contact of impact plate 24 and drive collar 22 causes chuck collar 20 to rotate at a different velocity than chuck jaws 18, resulting in the chuck jaws 18 displacing or retracting, depending upon the direction of rotation of shaft 28. The retriever 32 and leaves 33 are preferably made of spring steel. The retriever 32 and leaves 33 are preferably made of spring steel.

When the drill is actuated with the positioning collar in the chuck mode so as to displace jaws 18, the jaws will displace until they contact the drill bit. Lobes 25 on impact plate 24 and lobes 29 drive collar 22 interact so as to provide positive contact between impact plate 24 and drive collar 22, and further assure sufficient tightening of the jaws 18 against the drill bit. As the jaws contact the drill bit, the lobes 29 on rotating drive collar 22 impact against the lobes 25 on impact plate 24 so as to provide a hammering or impacting action which fully and sufficiently tightens the jaws against the drill bit. There remains, however, enough slipping between the lobes so that when the jaws are fully tightened drive collar 22 and chuck collar 20 regain a velocity which is identical to jaws 18 so that no damage to the drill or the invention occurs.

When postioning collar 30 is located in the chuck mode 10 and shaft 28 is rotated so as to fully retract the jaws, disengagement of impact plate 24 is provided by means of disengaging plate 34. As jaws 18 fully retract, they contact disengaging plate 34 and push plate 34 toward impact plate 24. A multiplicity of legs 38 extend through an identical number of voids 39 within drive collar 22 and contact impact plate 24 so as to push it away from drive collar 22. The disengaging plate 34 and legs 38 are rotating, and ride on the non-rotating impact plate 24 at a raised portion 41 of the impact plate 24. Springs 44 and retriever starter spring 43 are provided to allow impact plate 24 to reengage when the direction of rotation of the shaft is reversed. Retriever starter spring 43 catches one of the rotating legs 38 just enough to change the velocity of drive collar 22 in relation to jaws 18 so that jaws 18 begin to displace away from disengaging plate 34. This, in conjunction with the springs 44, forces the disengaging plate 34 away from impact plate and allow impact plate 24 to then reengage with drive collar 22.

The device may be modified for placing of the invention in the chuck mode 10 or drill mode 12 by means of a trigger 50, lever 54 and cable 52 as shown in FIGS. 7, 8 and 9. The invention works in the same manner, with rotation of postioning collar 30 accomplished by a cable 52 attached to postioning collar 30 by pin 53. Movement of a cable 52 sufficiently rotates postioning collar 30 to place the invention in the chuck mode 10 or drill mode 12. Movement of the cable is accomplished by a pivoting lever 54 and attached trigger 50, so that depressing of the trigger moves the lever, which in turn moves the cable 54 and ultimately positions the invention in the chuck mode. The cable is spring-loaded by spring 55 so that releasing trigger 50 causes the postioning collar to return to the drill mode 12. Trigger 50 may be located over switch 16 to actuate both trigger 50 and switch 16 simultaneously.

FIGS. 10, 11 and 12 disclose a second embodiment of the invention. This embodiment may again be used with virtually any reversible tool using a standard chuck. The chuck disclosed in FIG. 10 is identical to the chuck in the previous embodiment, having a chuck body 126, angularly displaced jaws 118, and a chuck collar 120, all of which operate as previous seen. Cylinder 122 is attached to chuck collar 120 so as to rotate at the same velocity as chuck collar 120, and to control the rotation of chuck collar 120.

Cylinder 122 has grooves formed on the inside diameter thereof parallel to shaft 128. The grooves are formed 360° degrees around the inside diameter, but only need be formed on the end of cylinder 122 which is nearest drill body 102, as will be seen.

A multiplicity of vanes 125 are attached to a clutch 127. As shown in FIG. 11, three vanes 125 may be so attached. The clutch 127 is concentric with the drill shaft, but is attached in a manner which allows clutch 127 to rotate independently of shaft 128. Vanes 125 are of a thin, somewhat flexible, material such as spring steel, and rotate with clutch 127. Vanes 125 extend from clutch 127 so as to locate within grooves 160. Vanes 12 are preferably thicker near the end contacting grooves 160 so as to provide impacting as they contact, while being thinner near the point of attachment to clutch 127 to allow them to flex.

As clutch 127 rotates within race 158. Race 158 is concentric with shaft 128, and is capable of displacement along a portion of shaft 128. In this embodiment, race 158 is displaced by means of parallel levers located on each side of race 158, which are attached to stirrup 159 in a spring-loaded fashion. Stirrup 159 may be centrally controlled, in turn controlling displacement of race 158 by depressing trigger 150.

A plate 134 is fixably attached to drill body 102 adjacent to clutch 127. Plate 134 approximates in diameter clutch 127. Plate 134 may be semimetallic, fiber, or other material which will provide maximum friction and minimal wear upon repeated contact with rotating clutch 127.

Actuation of the drill causes shaft 128, chuck body 126, jaws 118, chuck collar 120 and cylinder 122 to rotate. Vanes 125 which are located in grooves 160 on cylinder 122 normally cause cluch 127 to rotate within race 158. Since chuck collar 120 is rotating at the same direction and velocity as jaws 118, jaws 118 are neither displaced or retracted.

Depression of trigger 150 causes a displacement of race 158 toward drill body 102. As race 158 is displaced, it pulls with it clutch 127 until clutch 127 contacts plate 134. This contact causes clutch 127 to slow and then stop. Vanes 125 are located within grooves 160, and since they are flexible material, will tend to initially slip within grooves 160. In this manner, vanes 125 slow and then stop cylinder 122, although cylinder 122 is slowed at a slower rate than is clutch 127. Slowing cylinder 122 causes chuck collar 120 to rotate at a different velocity than jaws 118, and accordingly, the chuck jaws are displaced and retracted. As with the previous embodiment, the threaded interaction between collar 120 and jaws 118 causes displacement or retraction of the angular chuck jaws, depending upon the direction of rotation. The slipping of vanes 125 within grooves 160 allows tightening and aids release of jaws 118 via hammering or impacting, and the noise signals tightening to the operator.

FIGS. 13, 14 and 15 show a third embodiment of the device. Again, virtually any reversible tool having a standard chuck may be used. Chuck body 226, angular jaws 218, and chuck collar 220 are identical to the corresponding parts discussed in the first two embodiments. Cylinder 222 is identical to cylinder 122 in the previous embodiment, and again is attached to the chuck collar so as to control and rotate with chuck collar 220.

In this embodiment, vanes are again used to slow and then stop cylinder 222. These vanes 225 are displaced and retracted parallel to shaft 228 by means of levers 238 which are connected to stirrup 259 so as to act in unison. Movement of stirrup 259 and levers 238 is accomplished by depressing trigger 250, which is spring-loaded 252. As trigger 250 is depressed, it causes a displacement of vanes 225 into cylinder 222.

As in the second embodiment, vanes 225 are of a flexible material such as spring steel. Rotation of shaft 228 causes jaws 218 to rotate, and in normal operation, chuck collar 220 and cylinder 222 will rotate at the same velocity. However, as trigger 250 is depressed and vanes 225 are displaced into cylinder 222, vanes 225 contact grooves 260 of cylinder 222 so as to slow and then stop the rotation of cylinder 222. The rotation of cylinder 222 at a different velocity than chuck jaws 218 causes displacement and retraction of chuck jaws 218 by means of the threaded interaction between jaws 218 and collar 220. Jaws are displaced or retracted dependent upon the direction of rotation of the shaft.

Vanes 225 have a radiused corner which facilitates the insertion of the vanes into the cylinder 222 and grooves 260. The length and makeup of the vanes is such that they will initially slip within the grooves upon insertion, slowing and then stopping the cylinder 222. When jaws 218 are fully displaced or fully retracted, cylinder 222 can no longer rotate at a different velocity than shaft 228, and accordingly cylinder 222 will increase its velocity. When this occurs, vanes 225 will again slip within cylinder 222. The noise and vibration created by the vanes slipping within the grooves is a signal to the user to retract the vanes from the cylinder and back toward the drill body 202, and to continue with normal operation of the tool. The interaction of grooves 260 and vanes 225 further provide an impacting which aids in tightening the jaws 218 against the drill bit which is inserted within the chuck, and allows for full and sufficient securing of the drill bit within the chuck. Likewise, when the direction of shaft 228 is reversed, the initial slipping of the vanes within the grooves 260 provides for an impacting action.

What is claimed is:

1. A keyless tool chuck, comprising:
   (a) an impact plate which is located in a concentric fashion over a rotatable shaft of a tool so as not to rotate as said shaft rotates, but which is capable of displacement and retrieval along a portion of a length of said tool shaft;
   (b) a drive collar which is located in a concentric fashion over said shaft of said tool forward of said impact plate and which normally rotates as said shaft rotates, but which is slowed and then stopped by contact with said impact plate as said impact plate is displaced; and
   (c) a means for displacing and retrieving said impact plate, comprising:
      (1) a positioning collar located in a concentric manner over said tool shaft between a body of said tool and said impact plate, and whose rotation is limited;
      (2) a multiplicity of retriever leaves attached to a surface of said positioning collar nearest said impact plate; and
      (3) wherein said impact plate has a multiplicity of voids on a surface thereof adjacent to said positioning collar with said multiplicity of voids being equal to the number of said retriever leaves, and wherein each of said voids has a pin located therein so tha upon rotation of said positioning collar each of said retriever leaves enters said voids and retracts said impact plate by pulling said pin, and upon opposite rotation displaces said impact plate by exiting said void and pushing said impact plate toward said drive collar;
   (d) a chucking means having jaws therein which are angularly displaced and retracted in concert by mens of a threaded interaction between a chuck collar located thereon and said jaws, with rotation of said chuck collar being controlled by said drive collar and said impact plate so as to cause said jaws to displace when said impact plate is displaced against said drive collar and said tool shaft is rotated, and to cause said jaws to be retracted when said impact plate is displaced against said drive collar and said tool shaft is rotated in an opposite direction.

2. A keyless tool chuck as described in claim 1, wherein said impact plate and said drive collar have a multiplicity of lobes on the respective surfaces thereof which contact upon displacement of said impact plate so as to facilitate the contact and impacting between said impact plate and said drive collar.

3. A keyless tool chuck as described in claim 1 further comprising a disengaging plate located between said chucking means and said drive collar which disengages said impact plate from said drive collar upon said jaws being fully retracted by means of said disengaging plate being pushed by said jaws which in turn pushes said impact plate away from said drive collar by means of a multiplicity of legs connected to said disengaging plate and extending through said drive collar.

4. A keyless tool chuck as described in claim 2, further comprising a disengaging plate located between said chucking means and said drive collar which disengages said impact plate from said drive collar upon said jaws being fully retracted by means of said disengaging plate being pushed by said jaws which in turn pushes said impact plate away from said drive collar by means of a multiplicity of legs connected to said disengaging plate and extending through said drive collar.

5. A keyless tool chuck as described in claim 3, further comprising a starter spring located on said impact plate, which upon reversal of rotation of said tool shaft so as to displace the fully retracted jaws contacts one of said multiplicity of legs on said disengaging plate to hold said disengaging plate and said drive collar stationary and to begin displacement of said jaws until said impact plate can displace sufficiently to contact said drive collar.

6. A keyless tool chuck as described in claim 4, further comprising a starter spring located on said impact plate, which upon reversal of rotation of said tool shaft so as to displace the fully retracted jaws contacts one of said multiplicity of legs on said disengaging plate to hold said disengaging plate and said drive collar stationary and to begin displacement of said jaws until said impact plate can displace sufficiently to contact said drive collar.

7. A keyless tool chuck as described in claim 1, wherein rotation of said positioning collar so as to displace and retrieve said impact plate is accomplished by means of a cable actuated by a trigger means.

8. A keyless tool chuck, comprising:
   a. an impact plate which is located in a concentric fashion over a rotatable shaft of a tool so as not to rotate as said shaft rotates, but which is capable of displacement and retrieval along a portion of a length of said tool shaft;
   b. a means for displacing and retrieving said impact plate;
   c. a drive collar which is located in a concentric fashion over said shaft of said tool forward of said impact plate and which normally rotates as said shaft rotates, but which is slowed then stopped by contact with said impact plate as said impact plate is displaced;
   d. a chucking means having jaws therein which are angularly displaced and retracted in concert by means of a threaded interaction between a chuck collar located thereon and said jaws, with the rotation of said chuck collar being controlled by said drive collar and said impact plate so as to cause said jaws to displace when said impact plate is displaced against said collar and said tool shaft is rotated, and to cause said jaws to be retracted when said impact plate is displaced against said drive collar and said tool shaft is rotated in an opposite direction; and
   e. a disengaging plate located between said chucking means and said drive collar which disengages said impact plate from said drive collar upon said jaws being fully retracted by means of said disengaging plate being pushed by said jaws which in turn pushes said impact plate away from said drive collar by means of a multiplicity of legs connected to said disengaging plate and extending through said drive collar.

9. A keyless tool chuck as described in claim 8, further comprising a starter spring located on said impact plate, which upon reversal of rotation of said tool shaft so as to displace the fully retracted jaws contacts one of said multiplicity of legs on said disengaging plate to hold said disengaging plate and said drive collar stationary and to begin displacement of said jaws until said impact plate can displace sufficiently to contact said drive collar.

10. A keyless tool chuck, comprising:
    a. an impact plate which is located in a concentric fashion over a rotatable shaft of a tool so as not to rotate as said shaft rotates, but which is capable of displacement and retrieval along a portion of a length of said tool shaft;
    b. a means for displacing and retrieving said impact plate;
    c. a drive collar which is located in a concentric fashion over said shaft of said tool forward of said impact plate which normally rotates as said shaft rotates, but which is slowed and then stopped by contact with said impact plate as said impact plate is displaced, and wherein said impact plate and said drive collar have a multiplicity of lobes on the respective surface thereof which contact upon displacement of said impact plate so as to facilitate engagement and impacting between said impact plate and said drive collar;
    d. a chucking means having jaws therein which are angularly displaced and retracted in concert by means of a threaded interaction between a chuck collar located thereon and said jaws, with the rotation of said chuck collar being controlled by said drive collar and said impact plate so as to cause said jaws to displace when said impact plate is displaced against said drive collar and said tool shaft is rotated, and to cause said jaws to be retracted when said impact is displaced against said drive collar and said tool shaft is rotated in an opposite direction; and
    e. a disengaging plate located between said chucking means and said drive collar which disengages said impact plate from said drive collar upon said jaws being fully retracted by means of a said disengaging plate being pushed by said jaws which in turn pushes said impact plate away from said drive collar by means of one or more legs connected to said disengaging plate and extending through said drive collar.

11. A keyless tool chuck as described in claim 10, further comprising a starter spring located on said impact plate, which upon reversal of rotation of said tool shaft so as to displace the fully retracted jaws contacts one of said multiplicity of legs on said disengaging plate to hold said disengaging plate and said drive collar stationary and to begin displacement of said jaws until said impact plate can displace sufficiently to contact said drive collar.

12. A keyless tool chuck, comprising:
    a. a chucking means having jaws which rotate as a tool shaft rotates and which are angularly displaced and retracted in concert by means of a threaded interaction between said jaws and a chuck collar located thereon when said tool shaft is rotated and said chuck collar is stationary or rotated at a different velocity;
    b. a cylinder which is concentric with said tool shaft and which is attached to said chuck collar at one end of said cylinder, and which has a multiplicity of grooves parallel to said shaft on the inside diameter thereof opposite said chuck collar and which normally rotate as said tool shaft rotates;
    c. a clutch which normally rotates with said tool shaft and which has a multiplicity of vanes thereon which extend outwardly from the center thereof so as to contact said grooves of said cylinder so that upon slowing and stopping the rotation of said clutch, said vanes will initially slip within said grooves so as to slow said cylinder and said chuck collar and then to rest within said grooves so as to stop said cylinder and said chuck collar as said tool shaft and said jaws continue to rotate; and d. means for slowing and stopping said clutch.

13. A keyless tool chuck as described in claim 12, wherein said clutch may be displaced along said tool shaft toward a body portion of a tool from which said tool shaft protrudes, and further comprising a stationary fiber plate mounted around said tool shaft on said body portion and a means for displacing said clutch against said fiber plate.

14. A keyless tool chuck as described in claim 13, wherein said means for displacing said clutch is a race in which said clutch rides and which is concentric with the said tool shaft and which is displaced toward said body portion upon actuation of a lever so as to simultaneously displace said race toward and said clutch against said fiber plate.

15. A keyless tool chuck, comprising:
a. a chucking means having jaws which rotate as a tool shaft rotates and which are angularly displaced and retracted in concert by means of a threaded interaction between said jaws and a chuck collar located thereon when said tool shaft is rotated and said chuck collar is stationary or rotated at a different velocity;
b. a cylinder which is concentric with said tool shaft and which is attached to said chuck collar at one end of said cylinder, and which has a multiplicity of grooves parallel to said shaft on the inside diameter thereof opposite said chuck collar;
c. a multiplicity of vanes which may be displaced and retracted in parallel fashion to said tool shaft so as to contact said grooves upon displacement to retard rotation of said cylinder and then to rest within said grooves so as to stop said cylinder as said tool shaft continues to rotate and which allows said cylinder to continue to rotate as said shaft rotates when said vanes are retracted, and wherein said vanes are of a flexible material, and have a radiused corner thereon so as to facilitate entry into said cylinder; and
d. means for displacing and retrieving said vanes.

16. A keyless tool chuck as described in claim 15, wherein said vanes are displaced and retrieved by levers attached to each of vanes which are displaced and retrieved parallel to said tool shaft by means of each of said levers being connected to and controlled by a single spring-loaded trigger.

17. A keyless tool chuck, comprising
a. an impact plate which is located in a concentric fashion over a rotatable shaft of a tool so as to not rotate as said shaft rotates, but which is capable of displacement and retrieval along a portion of a length of said tool shaft;
b. a means for displacing and retrieving said impact plate which is capable of limited rotation, and which, upon rotation, pushes and displaces said impact plate, and which, upon rotation in an opposite direction, grasps said impact plate and retrieves said impact plate;
c. a drive collar which is located in a concentric fashion over said shaft of said tool forward of said impact plate and which normally rotates as said shaft rotates, but which is slowed and then stopped by contact with said impact plate as said impact plate is displaced;
d. a chucking means having jaws therein which are angularly displaced and retracted in concert by means of a threaded interaction between a chuck collar located thereon and said jaws, with rotation of said chuck collar being controlled by said drive collar and said impact plate so as to cause said jaws to displace when said impact plate is displaced against said drive collar and said tool shaft is rotated, and to cause said jaws to be retracted when said plate is displaced against said drive collar and said tool shaft is rotated in an opposite direction;
e. a disengaging plate located between said chucking means and said drive collar which disengages said impact plate from said drive collar upon said jaws being fully retracted by means of said disengaging plate being pushed by said jaws which in turn pushes said impact plate away from said drive collar by means of a multiplicity of legs connected to said disengaging plate and extending through said drive collar.

18. A keyless tool chuck as described in claim 17, further comprising a starter spring located on said impact plate, which upon reversal of rotation of said tool shaft so as to displace the fully retracted jaws contacts one of said multiplicity of legs on said disengaging plate to hold said disengaging plate and said drive collar stationary and to begin displacement of said jaws until said impact plate can displace sufficiently to contact said drive collar.

* * * * *